United States Patent [19]

Slabach, Jr. et al.

[11] 4,353,728
[45] Oct. 12, 1982

[54] TONG SUPPORT CARRIAGE FOR USE IN PRESS BENDING GLASS SHEETS

[75] Inventors: John C. Slabach, Jr.; Joseph B. Kelly, both of Crestline, Ohio

[73] Assignee: PPG Industries, Inc., Pittsburgh, Pa.

[21] Appl. No.: 262,104

[22] Filed: May 11, 1981

[51] Int. Cl.³ ............................................ C03B 23/02
[52] U.S. Cl. ..................................... 65/273; 65/106; 65/289
[58] Field of Search ....................... 65/106, 273, 289

[56] References Cited

U.S. PATENT DOCUMENTS

| | | |
|---|---|---|
| 2,111,370 | 3/1938 | Owen . |
| 2,167,318 | 7/1939 | Verlay . |
| 2,250,628 | 7/1941 | Forbes . |
| 2,251,159 | 7/1941 | Owen . |
| 2,270,470 | 1/1942 | Paddock . |
| 2,476,169 | 7/1949 | White et al. . |
| 3,565,598 | 2/1971 | Seymour .............................. 65/273 |
| 3,846,110 | 11/1974 | Burns .................................. 65/273 |

Primary Examiner—Arthur D. Kellogg
Attorney, Agent, or Firm—Edward I. Mates

[57] ABSTRACT

A tong supporting carriage is provided with an elongated tong support member having elongated slots with low friction bearing means for supporting in free sliding and rotating relation a vertical rod having a clevis attached to its lower end. A lever arm having tongs suspended freely on tong suspension points on opposite sides of said clevis is attached to the clevis intermediate its ends. When two pairs of tongs are used to grip a glass sheet to be bent about a vertical axis of bending, the tong suspension points move with the tongs gripping localized portions of the upper edge of the glass sheet and pivot the vertical rod, which slides longitudinally toward the other vertical rod as the distance between points subtended by the vertical rods on the glass sheet decreases as the glass sheet bends about a vertical axis. Kinking of the glass in the vicinity of the tong gripping points is thus minimized.

9 Claims, 4 Drawing Figures

TONG SUPPORT CARRIAGE FOR USE IN PRESS BENDING GLASS SHEETS

BACKGROUND OF THE INVENTION

Field of the Invention

This invention relates to shaping glass sheets by press bending when the glass sheets are suspended from tongs. It is well known that freely suspended tongs tend to hang in a vertical orientation. Glass sheets are gripped at their upper edges by a plurality of tongs when the glass is to be heated to its deformation temperature for shaping or heated to a temperature sufficient for tempering followed by rapid cooling. The use of tongs minimizes the mass of material that tends to absorb heat in a furnace provided for heating the glass sheets to their desired elevated temperature. Tongs have been used to provide a more efficient furnace operation than other means for conveying glass sheets that are more massive and that absorb a greater proportion of the furnace heat. Also, tongs provide a minimum disruption of the cooling operation that is used to develop a temper in the heated glass sheets.

Traditionally, tongs have been suspended from carriages which rode on overhead conveyors that carried the tongs and glass sheets gripped by the tongs through a tunnel-like furnace, a shaping station and a cooling area. Initially, the tongs were suspended from rigid points of support provided by the carriage.

Unfortunately, when glass sheets are bent, the portions gripped by the tongs are displaced from the vertical plane in which the flat glass sheet is initially supported. Some of the upper edge portions of a glass sheet gripped by the tongs move in one direction relative to the thickness of the glass, while other portions of the upper edge of the glass sheet move in the opposite direction during a glass sheet bending operation. When the tongs gripping the glass are freely hung from rigid points of suspension, the tongs tend to revert to a vertical hanging position, thereby causing the glass sheet to develop dimples or kinks in the tong gripping portions. The severity of each of these dimples or kinks is a function of the horizontal distance that each gripped portion of the glass sheet moves from the position it occupies prior to bending.

When glass sheets are bent about a sharp axis of bending, particularly in their central portion, the length of the glass sheet shortens considerably and the tongs which grip the glass sheet on opposite sides of the sharply bent portion are required to follow the gripped points of the glass a considerable horizontal distance toward the central axis of sharp bending. Unless the tong suspension points move distances equal to the movement of the tong gripping points as the glass sheet is shaped, the tongs become suspended obliquely and tend to move the glass gripping points apart after the molds, which shape the glass sheet, separate and release the obliquely suspended tongs to tend to return to vertically hung positions, which tend to distort the glass sheet.

When glass sheets are bent to non-symmetrical bends about a sharply bent vertical axis of bending, the tong gripping points move different horizontal distances toward the vertical axis. It is necessary that the tong suspension points move distances that are approximately equal to the movements of the glass gripping points. Otherwise, the tongs assume oblique hanging positions which tend to cause kinking and they tend to force the glass sheet to be distorted after the shaping molds are retracted. In addition, in asymmetrical bends, the outermost portion of the convex mold preferably engages and remains engaged with a reference point on the glass sheet from its time of initial contact until both molds engage the sheet completely. Asymmetrically hung tongs may cause the glass sheet to slide relative to the convex mold during the interval between initial engagement and final, complete engagement. This sliding may cause the sharply bent region to be displaced from its desired location.

In the past, many solutions have been attempted to minimize kinking of the glass due to tong engagement. Many of these involve moving the point of tong suspension in response to glass sheet shaping. For one reason or another, as will be explained in a more detailed analysis of prior patents, the prior solutions left something to be desired. A need still existed for a simple device that enables the tong suspension points to follow the movement of the tong gripping points of the glass sheet involving a minimum of moving parts and a sufficiently rigid tong support capable of withstanding the wide temperature range to which the tongs and the tong support structure are subjected during thermal tempering of glass sheets that would avoid glass kinks.

Description of Patents of Interest

U.S. Pat. Nos. 2,111,370 and 2,251,159 to Owen disclose apparatus for press bending glass sheets which supports a plurality of glass gripping tongs from a flexible bar that is engaged by rigid members having complementary shapes conforming to the complementary shapes of pressing molds disposed in spaced vertical relation over the molds. The flexible bar changes its shape upon engagement by the rigid members as the pressing molds move toward one another to shape the glass sheet. However, there is no provision made for retaining the flexible bar in its shaped configuration after the pressing molds retract from one another, so that, if the bar is permanently shaped during the glass shaping step, it must be replaced with a flat flexible bar for the next shaping cycle. On the other hand, if the bar is shaped temporarily by engagement with the rigid members, and returns to flatness when the rigid members are retracted, the tong suspension points along the flexible plate are displaced horizontally from the tong gripping points on the glass and this displacement would cause the glass to kink.

U.S. Pat. No. 2,167,318 to Verlay suspends the tongs that grip glass sheets from elongated wires or strings so as to minimize the angle of departure from the vertical when the tongs are required to move a particular distance in response to the shaping of a flat glass sheet about a vertical axis. This patent reduces the severity of kinks, but does not eliminate kinks because it does not displace the tong suspension points.

U.S. Pat. No. 2,220,470 to Paddock requires that tongs be located to grip the glass sheet at points where the curved configuration intersects the straight line configuration of the glass sheet before shaping. Such an arrangement fails to take into account the shortening of the chordal length between the tong gripping points at the glass sheet changes its configuration from flat to curved. Consequently, this patent replaces kinks in the direction of glass thickness with smaller kinks in the general direction of the glass sheet length, but fails to eliminate kinks entirely.

U.S. Pat. No. 2,250,268 to Forbes shows an arrangement for supporting tongs that enable the tong suspension points to twist and move response to the shaping of a flat glass sheet to a curve about a vertical axis. The tong supporting structure of this patent is quite complicated. One embodiment requires a horizontal pathway providing roller support for each tong suspension means and a vertical pivot for each pathway to enable each tong suspension point to follow the movement of its associated tong as the latter follows the shape of the glass. Rolling friction is hard to overcome at elevated temperatures, and an individual vertical pivot for each tong increases the chance of binding. In a more complicated version, a plurality of links are interconnected for suspending tong supporting elements. The links have a plurality of pivotal connections which are sources of friction, and interconnect a pair of horizontal members or rods at each end. These end members slide through blocks to take up any change in length due to articulation of the links. The multiplicity of pivotal connections in this construction presents considerable difficulty in maintenance because the apparatus is required to be exposed to a temperature cycle involving wide differences in temperature and each of the many pivotal connections between links represents a source of binding.

U.S. Pat. No. 2,476,169 to White et al discloses a technique for minimizing the kinking of glass when the glass is shaped about a horizontal axis. The glass engaging points of opposite tongs are disposed obliquely with respect to one another so as to be approximately normal to the tangent to the glass surface of the bent glass sheet portion engaged by the tongs.

U.S. Pat. No. 3,565,598 to Seymour discloses two pairs of self closing tongs freely suspended in pairs from lever arms. Each of the latter extends outward from a bracket welded to the bottom of an externally threaded rod. The latter is fixed in vertically adjustable position to a tong support bar. The lever arms are pivotally attached to the bracket in their central portion. No provision is made to move the externally threaded rods toward or away from one another relative to the length of the tong support bar to compensate for any difference in chordal distance between the tong gripping points as a flat glass sheet develops a curved shape.

U.S. Pat. No. 3,846,110 to Burns discloses a pair of tong carrying arms pivotally attached to each of a pair of vertical spindles, which also carry a tong. The tongs suspended from the spindles are located to grip the upper edge of the glass sheet at points where the curved configuration of the glass sheet intersects the position occupied by the flat glass sheet. This patent does not compensate for any difference in chordal distance between the tong gripping points for the spindle-suspended tongs as a flat glass sheet changes its shape to a curved configuration. The tongs suspended from pivoted arms are free to move with the pivoted arms in the direction of the glass thickness as the glass sheet changes its shape about a vertical axis, and by adjusting both the length and angle of rotational displacement of each pivoted arm, the corresponding tong supported from each pivoted arm may be made to move as desired from an initial flat glass gripping position to a bent glass gripping position. However, the suspension point for the middle tong of each set that hangs from the spindle is not free to move in response to the movement of the tong gripping points as the glass sheet length shortens. Hence, this apparatus is limited for use with a bending operation for shaping a glass sheet to a shallow curvature.

It will be noticed from a study of the patents mentioned previously that the glass sheet bending art lacked a simple structure with a minimum of moving parts that permits tong suspension points to move with tongs and the glass and also permits the tongs to move toward one another when the longitudinal or horizontal dimension of a glass sheet is shortened as a result of its shaping about a vertical axis.

SUMMARY OF THE INVENTION

The present invention comprises novel structure for a tong support carriage. The carriage of this invention has a tong support member with at least two elongated slots, each of which receives a vertical rod in such a manner that the rods are capable of free sliding motion in the lengthwise direction of the slots and are also capable of freely pivoting about vertical axes corresponding to their axial lengths. Each vertical rod supports a clevis at its lower end and a horizontal lever arm is mounted at its intermediate portion to the clevis and extends horizontally from said clevis in both directions. A pair of tongs is suspended from each lever arm, one tong near each of its longitudinal extremities. The tongs are suspended vertically from rings that engage a transverse slot or cross groove in each of the lever arms.

The elongated slots are disposed on opposite sides of a reference line superimposed over a reference point of a glass sheet to be shaped. Thus, when the chordal length of a glass sheet is reduced as a result of its being shaped about a vertical axis of bending, the tongs at the opposite end portions of each lever arm move in opposite directions relative to the thickness of the glass to pivot the associated lever arm, together with its clevis about the vertical axis defined by its associated vertical rod. The latter moves inward toward the corresponding other vertical rod to compensate for the shortening of the chordal length of the glass sheet. The tongs remain vertically suspended, because the point of suspension for each tong moves in response to movement of its suspended tong following the change of glass sheet shape. Therefore, the tongs do not cause the glass to kink.

The construction of the tong support carriage, and particularly, the tong support member, is such as to provide a minimum of moving parts that tend to provide a source of friction which inhibits the operation of the device. The slotted portions of the tong support member and metal washers for each rod are treated with lubricant to insure longitudinal and rotary movement of the rods relative to the slots to enable the tong suspension points to follow the tong gripping points when the glass sheet changes shape, even when the shape involves a sharp curve in the central portion of the sheet.

The present invention will be understood more clearly in the light of a description of a specific embodiment which follows. In the description, the term "sharply bent portion" refers to a radius of curvature as little as 8 inches (20 centimeters) or less, over a length of as much as 3 inches (7.6 centimeters) or more.

BRIEF DESCRIPTION OF THE DRAWINGS

In the drawings that form part of a description of a specific embodiment of the present invention.

DESCRIPTION OF A PREFERRED EMBODIMENT

Figure 1:
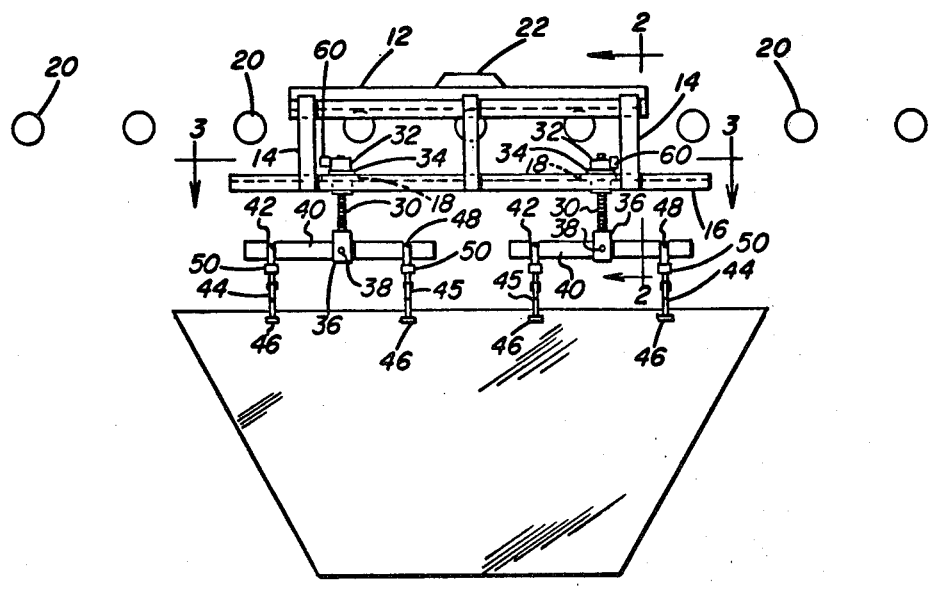
FIG. 1 is an elevational view of a carriage provided with means for supporting tongs to permit movement of the tongs and tong suspension means in response to the shaping of the glass sheet according to the present invention.
Figure 2:
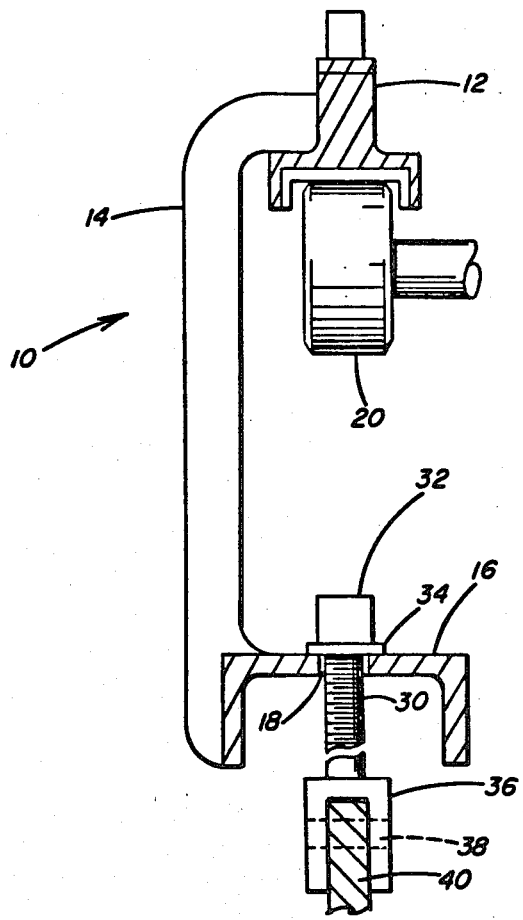
FIG. 2 is an enlarged, fragmentary, vertical sectional view taken along the line 2—2 of FIG. 1.

In the drawings, a tong supporting carriage 10 is shown comprising a superstructure 12, a plurality of C-shaped vertical members 14 and a straight, elongated tong support member 16 of a low friction material capable of withstanding a wide range of temperatures such as steel. The C-shaped vertical members 14 interconnect the superstructure 12 with the elongated tong support member 16. The latter is provided with a pair of straight, elongated slots 18. The total length of the slots 18 is correlated with the reduction in chordal distance between a pair of subtended points that results from bending a glass sheet having the sharpest bend about a vertical axis contemplated for production, as will be explained later in greater detail.

The superstructure 12 has an inverted channel shaped configuration to ride along a series of conveyor rolls 20 according to a cycle of conveyor movement determined by the engagement of a cam 22 mounted atop the superstructure 12 with a set of spaced limit switches (not shown) that actuate a series of timers to control the movement of the carriage 10 through a heating furnace (not shown) into a position at a shaping station where the carriage stops for a predetermined time interval while a pair of press bending molds are actuated to engage and disengage a glass sheet carried by the carriage and then moves the carriage to a cooling station and an unloading station, and finally returns the carriage on a return conveyor (not shown) to a loading station (not shown) at the upstream end of the heating furnace in a manner well known in the art.

At the shaping station, press bending molds of complementary shape, such as a convex mold comprising a convex shaping plate 24 and a concave mold comprising a concave shaping plate 26 (FIGS. 3 and 4), each provided with a cover 28 of fiber glass cloth, are used to press bend a heat-softened glass sheet suspended from tongs between the molds. The molds are preferably of the type described in U.S. Pat. No. 3,367,764, and comprise a relatively flexible shaping plate 24 or 26 of metal more rigid than the heat-softened glass sheet connected by connecting members 25 to a rigid backing plate 27 whose rigidity is greater than that of its connected shaping plate. The latter is connected to a piston plate for movement in a substantially horizontal direction between a retracted position and a glass engaging position. The covers are preferably of the type described in U.S. Pat. No. 3,148,968 to Cypher and Valchar, and are composed of fiber glass cloth knit from textured yarn. They extend over the entire surface of each shaping plate and are held in unwrinkled condition by clamps that attach the ends of the covers to the backing plates 27.

A vertical rod 30, preferably one that is externally threaded, is slidably supported for linear movement along each of the elongated slots 18 by an internally threaded locking sleeve 32 threaded about the vertical rod 30 with its bottom surface resting on a washer 34. The diameter of each vertical rod 30 is slightly less than the width of the associated elongated slot 18 to permit the rod to rotate freely about a vertical axis as well as to slide freely in a horizontal direction relative to the length of the slot 18. The washers are composed of a smoothly surfaced low friction material capable of withstanding a wide range of temperatures. Stainless steel, particularly chrome steels and nickel plated metals are suitable materials for the washers. In addition, a suitable lubricant is applied to the washer and to the upper surface of the tong support member 16 to minimize friction.

A clevis 36 is fixed to the bottom end of each vertical rod 30. The clevis includes a horizontally extending pivot pin 38. A lever arm 40 is pivotally supported intermediate its ends on the pivot pin 38 and has a cross groove 42 near each of its longitudinal ends. A self-closing outer tong 44 is suspended from the outer cross groove 42 of each lever arm 40 and a self-closing inner tong 45 is suspended from the inner cross groove of each lever arm.

The tongs are preferably of the self-closing type depicted in U.S. Pat. No. 3,089,727 to Hay and are provided with a pair of freely rotatable, glass engaging discs 46 at the lower ends of a pair of lower criss-crossing lever arms, and an upper ring member 48 that is received in one or another of said grooves 42. The upper ring member is coupled to a clevis 50 that supports a common hinge pin that receives pivotally and interconnects the upper ends of an upper pair of apertured lever arms forming part of said tongs 44. The lower end of each upper lever arm is pivotally attached to the upper end of a criss-crossing, apertured lever arm to enable the discs to move toward one another as the tongs are freely suspended. If desired, pointed pins may be substituted for the discs as the glass sheet engaging elements for the tongs.

Figure 3:
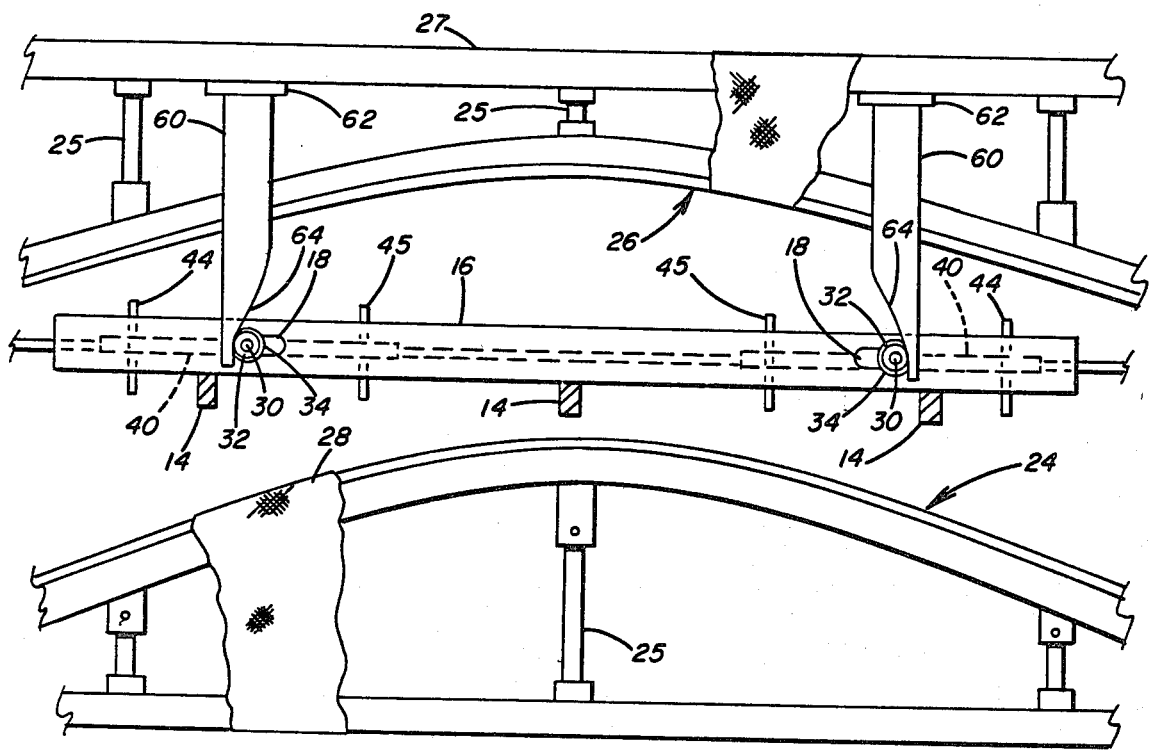
FIG. 3 is a longitudinal sectional view in plan taken along the line 3—3 of FIG. 1, showing the relationship of a flat glass sheet an the tongs and tong supporting elements relative to an elongated tong support member having elongated slots that form part of a tong supporting carriage according to the present invention taken before a glass sheet has been shaped.
Figure 4:
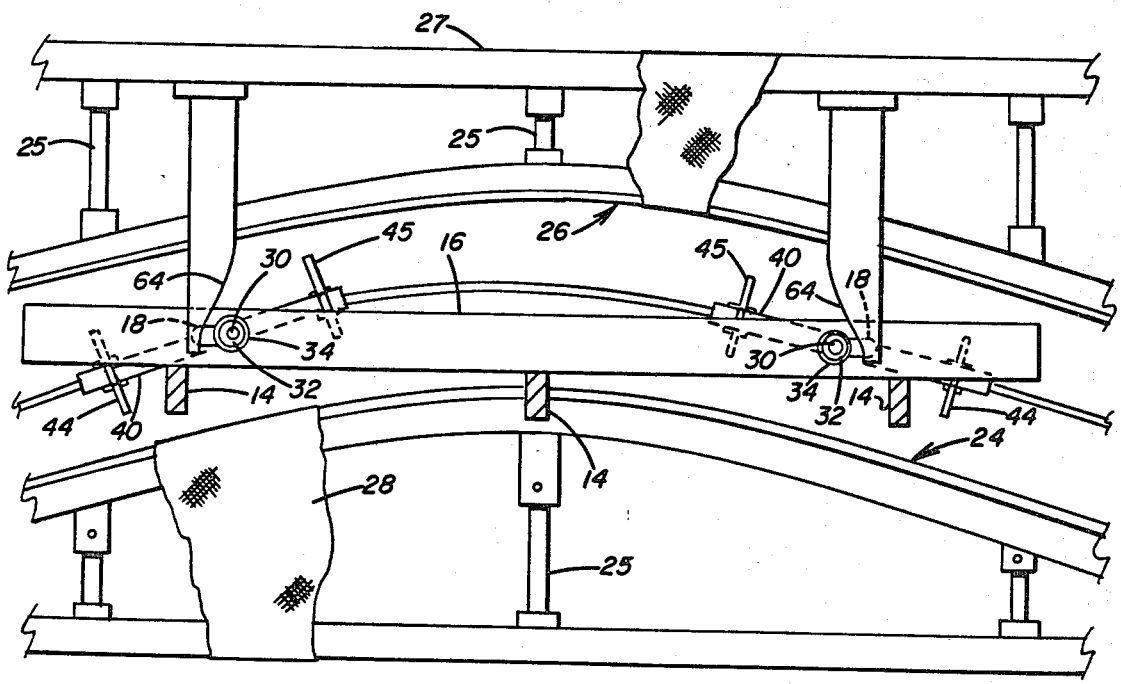
FIG. 4 is a view similar to FIG. 3, showing how the tongs and tong suspension means are located subsequent to shaping the sheet about its vertical axis and after the press bending molds have been separated from the press bent sheet, with certain pairs also shown in phantom in the positions they occupy when a mold engages a glass sheet.

In this manner, each tong 44 is freely hung from the cross groove 42 from which it is suspended. When a flat glass sheet to be shaped is gripped by the pairs of glass engaging discs 46 of the tongs 44, the lever arms 40 extend parallel to the horizontal dimension of the flat glass sheet and of the elongated tong support member 16 with the vertical rods 30 suspended from first positions toward the outer ends of the elongated slots 18, as depicted in FIG. 3.

The vertical rods 30 are moved outward to the outer ends of the elongated slots 18 when a flat glass sheet is loaded into gripping engagement by the tongs. The lever arms 40 are oriented to be parallel to the tong support member 16. Points on the glass sheet subtended by the vertical rods 30 define a line that becomes a shortened chordal distance when the glass sheet is shaped about a vertical axis.

As the shaping plates 24 and 26 of the press bending molds close against the glass sheet, the sheet develops a shape corresponding to the complemental shapes of the molds. When the bend includes a component of curvature in a continuous curve about a vertical axis of bending and the vertical rods 30 are vertically aligned over subtended points on the flat glass, the glass engaging discs of the outer tong 44 suspended from each lever arm move toward the convex mold while the glass engaging discs of the inner tong 45 moves toward the concave mold. In response, the tong suspension points where the rings 48 engage cross grooves 42 move in response to the movement of the glass sheet engaging discs 46 to return the tongs from opposite oblique suspensions to free hanging vertical suspension, thereby causing the lever arms 40 and their connected vertical rods 30 to pivot. The straight line distance between the subtended points decreases to become a chordal distance as the glass sheet takes shape. In response to the shortening of the chordal distance, the vertical rods 30 slide inward along the elongated slots 18 toward one another. The lever arms 40 rotate in response to the movement of the glass sheet portions that move away from the initial vertical plane of suspension for the flat glass sheet into the positions depicted in FIG. 4 as the sheet is shaped and the tongs 44 and 45 suspended from each lever arm 40 move in opposite directions from the vertical plane of suspension for the flat glass sheet.

When a glass sheet is bent to a shape that is symmetrical about its vertically extending center line, it is convenient that a reference line on the member 16 align with the center line of the glass sheet, that the reference line is equidistant from the elongated slots 18 and that the slots are of equal length, their total length equalling the shortening of the glass sheet length between the points subtended by the vertical rods 30 when the flat glass sheet is loaded, and that the components of the lever arm 40 extending in opposite directions from the clevis 36 be of equal length. It is also convenient to stop the carriage 10 in a position at the shaping station where its reference line is aligned with the outermost portion of the convex mold. Under such conditions, the tongs move symmetrically about the vertical rods and the vertical rods slide equal distances when the molds produce a symmetrical bend in the glass sheet.

The movements of the tongs and the vertical rods may differ from one another when the molds produce an asymmetrical bend. The slot locations may be asymmetrical relative to the reference line for the tong support member, the length of the slots may differ from one another and the length of the lever arm components extending in opposite directions from the clevis may differ, depending on the nature of the assymetry of bend.

A low friction lubricant is preferably applied to the upper surface of the tong support member 16 and the metal washers 34 to minimize the danger of friction preventing free rotation of the vertical rods relative to the washers or free sliding of the rods and washers relative to the elongated slots. Boron nitride is an appropriate lubricant. Other suitable lubricants incorporate metal flake or powder, such as copper, aluminum, nickel, etc. with graphite and/or molybdenum disulfide and/or zinc oxide fillers and grease. A lubricant sold by Never-Seez Compound Corporation, Broad View, Illinois, as NS 160 need be applied only once per eight hour shift. The latter composition contains aluminum and copper flake, and graphite filler dispersed in grease. More specifically, Never-Seez ® 160 is a dispersion of zinc oxide and aluminum, copper, and graphite powders in grease that has a rated boiling point of 400° F., a vapor pressure of 0.1 millimeter of mercury at 68° F. (20° C.) and a specific gravity of 1.26 at 72° F.

Because the vertical rods 30 and sleeves 32 rest on lubricated washers 34, there is minimum friction resisting the free sliding motion of the rods along the elongated slots 18 as the glass sheet undergoes shaping. Also, the rods 30 have diameters that are smaller than the width of the slots, so that the rods can pivot freely with the lever arms 40 in response to the movement of the tong gripping discs 46 in opposite directions relative to the glass thickness as the glass sheet is shaped. Only two moving parts of this apparatus may develop friction as the tong suspension points follow the movement of the glass gripping tong discs, namely, the interfaces between the two vertical rods 30 or washers 34 and the tong support member 16. Since these elements are treated with low friction lubricating material and represent the only two frictional interfaces, the present invention provides a relatively simple structure that provides little frictional resistance to both the longitudinal and rotational movements of the lever arms from which the tongs hang when the freely hung tongs move in response to the moement of the tong-gripped glass sheet points, compared to the prior art apparatus having a plurality of friction surfaces (at least one for each tong).

As further insurance that the vertical rods 30 will move toward one another when the press bending molds engage the glass sheet to shape the latter, one of the press bending molds may be provided with a pair of cam fingers 60. Each finger extends inward of the mold toward one or the other of the elongated slots 18 in a horizontal plane that intersects a corresponding vertical rod 30 or its associated sleeve 32. Each finger 60 has a vertical rearward extension 62 that is mounted on reinforcing plate 27 in such a manner that the extension 62 extends vertically upward from the reinforcing plate 27. The inner sides 64 of the cam fingers 60 that face one another are shaped to provide cam surfaces that synchronize the inward movement of the vertical rods toward one another with the closing movement of the shaping mold. Thus, for a symmetrical shape, the cam fingers are mirror images of one another and equally spaced from a reference line intermediate the slots 18 along the member 16. For asymmetrical shapes, the cam fingers have cam surfaces that are of different shapes and that may be located at different distances from said reference line. The cam fingers 60 preferably extend from the mold that faces the side of the carriage 10 opposite that occupied by the C-shaped members 14 to avoid the possibility of an accident in the furnace.

Since carriages are used in the production of several different patterns, each of which may require different lengths of slot and different distances from the reference line to the corresponding slots for use with molds for different patterns, each carriage may be supplied with a tong support member having elongated slots at least as long than the longest slots required for any production pattern contemplated and auxiliary plates having arcuate ends facing one another may be attached to the tong support member in position to overlie a portion of the elongated slots to define the proper ends and locations for the slots required for any particular production pattern. The arcuately ended auxiliary plates may be longitudinally adjustable over the tong support member 16 to assume positions conforming to the optimum positions to be occupied by the vertical rods 30 when the tongs grip a flat glass sheet and after bending is completed, respectively, or a pair of slot-end defining members may be replaced over each slot when a production pattern is changed. Each slot in the tong support member is longer than one-half the difference in distance betwen points subtended in the glass sheet by positions occupied by the vertical rods when the tongs grip a flat glass sheet for a most severe pattern contemplated compared to the distance between the corresponding subtended points after the glass sheet is shaped to insure that the carriage can accommodate all production items.

In a typical production operation, when a carriage 10 arrives at a loading station, the vertical rods 30 are slid outwardly to engage the outer ends of the elongated slots 18 (or the arcuate ends of the outer auxiliary plates, if such are included) and a flat glass sheet is engaged by the glass engaging discs 46 of the freely hanging self-closing tongs 44 and 45. The lever arms 40 naturally pivot with the vertical rods 30 to extend parallel to the tong support member 16. As the carriage moves through a tunnel-like furnace, the glass sheet is heated to its deformation temperature so that on its arrival at the shaping station between the shaping plates 24 and 26, the glass sheet is readily shaped. As the glass sheet changes shape, it shortens. The lever arms 40, which provide the tong suspension points, rotate about the vertical axes defined by the vertical rods 30 and the latter slide toward each other as the distance between the glass sheet points subtended from the rods 30 decreases.

The vertical rods 30 may be separated by outwardly sliding them relative to the elongated slots 18 any time after the bent glass sheet is unloaded from the tongs. Preferably, the outward sliding is postponed until after the carriage has returned to the loading station, because the temperature of the tongs and carriage has a chance to cool somewhat between the time a glass sheet is unloaded from a carriage at the end of one treatment cycle and the time another glass sheet is loaded at the beginning of the next treatment cycle involving the carriage.

The form of this invention shown and described in this specification represents an illustrative preferred embodiment thereof. It is understood that various other changes may be made such as the selection of a low friction, high temperature lubricant without departing from the gist of the invention defined in the claimed subject matter which follows.

We claim:

1. A carriage for supporting tongs that grip a glass sheet during press bending comprising a straight, elongated tong support member, a pair of straight, elongated slots for said tong support member, a vertical rod supported for sliding movement along each of said elongated slots between first and second positions and free to rotate about the axis of said rod, a clevis attached to the lower end of each rod, a lever arm mounted intermediate its ends to said clevis for rotation therewith about a vertical axis, a tong suspended from each said lever arm on each side of said clevis, said vertical rods being free to slide to said first positions along said tong support member to enable said tongs to grip the upper edge of a flat glass sheet at spaced points flanking points subtended by said vertical rods and to slide to said second positions spaced closer to one another than the distance between said first positions when said glass sheet is shaped by press bending and the distance between said spaced subtended points is shortened.

2. A carriage as in claim 1, wherein said vertical rods have diameters thinner than the width of said corresponding slots, whereby said lever arms are free to rotate in response to the shaping of said glass sheet as said vertical rods move toward one another along the length of said straight, elongated slots.

3. A carriage as in claim 1 or 2, further including superstructure means carried by said carriage adapted to engage conveyor means to move said carriage into and out of a glass sheet shaping position at a shaping station.

4. A carriage as in claim 1 or 2, wherein said straight, elongated slots have lengths longer than one-half the shortening of said distance between said subtended points on said glass sheet as the glass sheet is shaped about a vertical axis of bending.

5. A carriage as in claim 1, for use in shaping a glass sheet to a bend about a vertical axis wherein each portion of the glass sheet on each side of a reference point is shaped, wherein each of said elongated slots is disposed on an opposite side of a reference line of said elongated tong support member, which reference line is vertically aligned with said reference point.

6. A carriage as in claim 5, adapted to bend said glass sheet to a shape that is substantially symmetrical about said reference point wherein said slots are of equal length and are spaced equal distances from said reference line of said tong support member.

7. A carriage as in claim 1, wherein each of said vertical rods are externally threaded to receive an internally threaded locking sleeve, which rests upon a washer of low friction material free to slide and rotate relative to said tong support member with a minimum of frictional resistance.

8. A carriage as in claim 7, wherein said washers and tong support member are provided with a coating of low friction material.

9. A carriage as in claim 7, further including a pair of press bending molds of complementary curvature, means to provide relative movement to said molds between a recessed position and a glass sheet engaging position, and a pair of cam fingers operatively connected to at least one of said molds, each adapted to engage a locking sleeve for a corresponding vertical rod to help slide said vertical rod toward the other vertical rod in coordination with the movement of said mold toward said glass sheet engaging position.

* * * * *